(12) United States Patent
Abe et al.

(10) Patent No.: US 6,574,560 B2
(45) Date of Patent: Jun. 3, 2003

(54) VEHICLE OPERATION ASSIST CONTROL SYSTEM

(75) Inventors: Masato Abe, Tokyo (JP); Yoshimi Furukawa, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 32 days.

(21) Appl. No.: 09/985,635

(22) Filed: Nov. 5, 2001

(65) Prior Publication Data

US 2002/0059026 A1 May 16, 2002

(30) Foreign Application Priority Data

Nov. 6, 2000 (JP) .......................................... 2000-337373

(51) Int. Cl.$^7$ .............................. B60T 8/00; B60T 8/24

(52) U.S. Cl. ......................................... 701/301; 342/71

(58) Field of Search ................................. 701/301, 208; 342/70, 71; 180/167, 169; 340/436; 303/146

(56) References Cited

U.S. PATENT DOCUMENTS

| 5,633,705 | A | * | 5/1997 | Asayama | .................... 356/3.14 |
| 6,157,892 | A | * | 12/2000 | Hada et al. | ................. 701/301 |
| 6,161,071 | A | * | 12/2000 | Shuman et al. | ................ 701/48 |
| 6,256,561 | B1 | * | 7/2001 | Asanuma | ..................... 701/41 |
| 6,411,898 | B2 | * | 6/2002 | Ishida et al. | ................ 701/211 |

* cited by examiner

*Primary Examiner*—Michael J. Zanelli
(74) *Attorney, Agent, or Firm*—Arent Fox Kinter Plotkin & Kahn, PLLC (57) ABSTRACT

In a vehicle operation assist control system for assisting a vehicle operator to operate a vehicle, a distance to the obstacle and a width of the obstacle are detected by a radar or the like, and, when an obstacle is detected, the system determines an evasion path and accordingly modifies the map information available to the system. Therefore, the system, being aware of the situation, would not interfere with the vehicle operator taking an evasive action. The evasive path may be defined as a curvature which changes as a sinusoidal mathematical function of the position of the vehicle along the path. The control system may be based on a yaw rate control or a vehicle side slip angle control.

4 Claims, 9 Drawing Sheets

Fig. 10

# VEHICLE OPERATION ASSIST CONTROL SYSTEM

TECHNICAL FIELD

The present invention relates to a vehicle operation assist control system for assisting a vehicle operator to operate the vehicle according to map information and/or road information, and in particular to a vehicle operation assist control system which normally reduces the effort required for a vehicle operator to operate the vehicle but would not interfere with the vehicle operator taking an evasive action when necessary.

BACKGROUND OF THE INVENTION

In recent years, various efforts have been made to reduce the efforts required for the vehicle operator to drive the vehicle. As a part of such efforts, various forms of intelligent transportation systems (ITS) have been proposed. An ITS typically collects information on the road which lies ahead of the vehicle so that the vehicle can travel along the road without the vehicle operator making any effort to operate the vehicle. Also, an ITS can prevent traffic accidents, and contributes to the reduction of emissions and other environmental problems by avoiding traffic congestions. Road information can be acquired by referring to map data incorporated in the system according to position data obtained from satellite navigation systems (GPS), radio wave beacons provided along the road, or induction cables buried under the road.

In an early stage of ITS development, a totally automated vehicle operation was sought as an application of a highly advanced form of artificial intelligence, and the expectation was high. Extraction of road boundaries by image recognition techniques and detection of obstacles by radars were examples of such efforts. Various developments have been achieved, but very few of them were considered to be applicable to practical situations. This owes to the fact that the technology for the recognition of environment has not been fully perfected as a practical and reliable system. For this reason, none of the intelligent transportation systems have been successfully put to practical use to the knowledge of the inventors.

For the intelligent transportation system to be reliable enough to be put to practical use, the inventors believe that the intervention of the vehicle occupant is indispensable. On the other hand, the intelligent transportation system is required to be able to minimize the mental and physical burden on the vehicle operator. Therefore, it is desirable to achieve a balance of authority between the vehicle operator and the system. In particular, when the vehicle encounters an obstacle which is not included in the traffic environment information, and the vehicle operator is required to take an evasive action on his/her own, the vehicle operator assist control system must not interfere the vehicle operator's effort to take such an action.

BRIEF SUMMARY OF THE INVENTION

In view of such problems of the prior art and the inventors' recognition, a primary object of the present invention is to provide a vehicle operation assist control system which can establish a balance of authority between the vehicle occupant and the control system.

A second object of the present invention is to provide a vehicle operation assist control system which enables the vehicle occupant to take an evasive action when necessary without being interfered by the control system.

A third object of the present invention is to provide a vehicle operation assist control system which gives a high priority to the vehicle operator' intension but minimizes the effort, both physical and psychological, that is required for the vehicle operator to operate the vehicle.

According to the present invention, such objects can be accomplished by providing a vehicle operation assist control system for assisting a vehicle operator to operate a vehicle, comprising: map information means for providing map information of a road ahead of the vehicle; vehicle operation assist means for assisting the vehicle operator to operate the vehicle; and obstacle information acquiring means for acquiring information on an obstacle which lies ahead of the vehicle, said information including a distance to the obstacle and a width of the obstacle; the vehicle operation assist means being adapted to determine an evasion path, when an obstacle is detected by the obstacle information acquiring mean, and modifying the map information provided by the map information means, according to the distance to the obstacle and the width of the obstacle detected by the obstacle information acquiring means.

The obstacle information acquiring mean may consist of a radar using ultrasonic sound, electromagnetic radiation or a laser beam among other possibilities. The map information means may consist of an arrangement for storing map information and an arrangement for identifying the position of the vehicle such as a satellite navigation system (GPS), a beacon or other telecommunication path for receiving information on the position of the vehicle from a fixed station or an inductive cable buried under the road or provided along the road. The map information may also be downloaded from a fixed station. In any case, because the vehicle operation assist means takes into account the information on an obstacle, the control action of the system would not interfere with the vehicle operator when taking a necessary evasive action.

For the economy of computation, the evasive path may be defined as a curvature which changes as a sinusoidal mathematical function of the position of the vehicle along the path. The vehicle operation assist means may consist of a steering system which applies a certain steering torque so as to achieve a target vehicle side slip angle or yaw rate computed from the dynamic state of the vehicle in relation with the road, or may consist of a drive/brake force distribution system which distributes a drive/brake force between the right and left wheels of the vehicle, again, so as to achieve a target vehicle side slip angle or yaw rate computed from the dynamic state of the vehicle in relation with the road

BRIEF DESCRIPTION OF THE DRAWINGS

Now the present invention is described in the following with reference to the appended drawings, in which.

DETAILED DESCRIPTION OF THE PREFERRED EMBODIMENTS

Various proposals have been made to develop vehicle operation assist control systems for reducing the mental and physical fatigue of the vehicle operator. The road information can be converted into numerical data through various techniques. For instance, the road information can be given as the curvature of the road on which the vehicle is traveling at each time point. Such data can be combined with other map information and GPS information, and can be fed to the vehicle via a beacon provided along the road or any other form of telecommunication. The method for assisting the operation of the vehicle may consist of applying an assist torque to the steering wheel, steering the rear wheel, and applying a yaw moment to the vehicle by distributing different drive/brake forces to the right and left wheels, among other possibilities. Based on such a recognition, various modes of vehicle operation assist control according to the present invention are described in the following.

Mode 1

When the vehicle is traveling at a constant speed of V, the yaw rate of the vehicle traveling a road path having a radius of curvature $\rho$ is $V/\rho$. This is given as a target yaw rate, and a yaw moment Mz proportional to the deviation of the actual yaw rate from this target yaw rate $\Delta\gamma=\gamma-(V/\rho)$ is applied to the vehicle. The gain for this control is obtained from the restoring moment of the vehicle equipped with tires having a linear property as the vehicle undergoes a yaw movement.

$$M_z=-(2\alpha/V)(L_f^2K_f+L_r^2K_r)\{\gamma-(V/\rho)\}$$

where $L_f$ is the distance between the gravitational center and the front axle, $L_r$ is the distance between the gravitational center and the rear axle, $K_f$ and $K_r$ are cornering stiffnesses of the front and rear wheels, respectively, and $\alpha$ is a coefficient representing the magnitude of assistance. $\alpha$ is 1.0 in case of a 100% assist control, but is normally selected as 0.5.

Mode 2

Similarly, the gain can be obtained by finding the value of $M_z$ which gives rise to the yaw rate of $-\Delta\gamma$ when the vehicle equipped with tires having a linear property is traveling at a constant speed.

$$mV(d\beta/dt)+2(K_f+K_r)\beta+\{mV+(2/V)(L_fK_f-L_rK_r)\}\Delta\gamma=0$$

$$2(L_fK_f-L_rK_r)\beta+I(d\Delta\gamma/dt)+(2/V)(L_f^2K_f+L_r^2K_r)\Delta\gamma=M_z$$

Because $(d\beta/dt)=(d\Delta\gamma/dt)=0$ $$M_z=2L^2K_fK_r(1+AV^2)\{\gamma-(V/\rho)\}/\{(K_f+K_r)V\}$$

where m is the mass of the vehicle, $\beta$ is vehicle body side slip angle, L is the distance between the front and rear axles, and A is a stability factor.

Mode 3

According to a principle similar to that of Mode 1, a sliding mode control is performed by using $S=\gamma-(V/\rho)$ as a sliding surface.

$$(dS/dt)+kS=0$$

Therefore, $$(d\gamma/dt)-\{(dV/dt)/\rho\}+k\{\gamma-(V/\rho)\}=0$$

Because $(dV/dt)=0$ when the vehicle is traveling at constant speed, and $$I(d\gamma/dt)=2(L_fY_f-L_rY_r)+M_z$$

it follows that $$M_z=-2(L_fY_f-L_rY_r)-kI\{\gamma-(V/\rho)\}$$

where $\rho$ is estimated, k is an appropriately selected constant, $Y_f$ and $Y_r$ are cornering forces of the front and rear wheels based on a tire model, respectively.

Mode 4

When the vehicle is traveling at a constant speed of V along a path having a radius of curvature $\rho$, the lateral acceleration is $V^2/\rho$. If it is assumed that the tires demonstrate a linear property, the lateral forces of the front and rear wheels are $(L_r/L)(mV^2/\rho)$ and $(L_f/L)(mV^2/\rho)$, respectively. Because $\gamma=(V/\rho)$, the following relationship holds for the rear wheels.

$$-2K_r\{\beta-(L_r/V)(V/\rho)\}=(L_f/L)(mV^2/\rho)$$

$\beta$ obtained from this equation is named as $\beta_m$. Then, $$\beta_m=(V/\rho)\{(L_r/V)-(m\ L_fV/2LK_r)\}$$

This is regarded as the target side slip angle, and a yaw moment proportional to $\Delta\beta=(\beta-\beta_m)$ is applied to the vehicle. The gain is obtained as the restoring moment for a unit vehicle body side slip angle as given in the following.

$$M_z=-2\alpha(L_fK_f-L_rK_r)(\beta-\beta_m)$$

Mode 5

According to a principle similar to that of Mode 4, the gain is obtained by computing a yaw moment which would give rise to a side slip angle of $-\Delta\beta$ under a steady state condition. More specifically, based on the following equations $$2(K_f+K_r)\Delta\beta+\{mV+(2/V)(L_fK_f-L_rK_r)\}\gamma=0$$

$$2(L_fK_f-L_rK_r)\Delta\beta+(2/V)(L_f^2K_f+L_r^2K_r)\gamma=M_z$$

the following equation can be obtained.

$$M_z=4L^2K_fK_r(1+AV^2)(\beta-\beta_m)/\{mV^2+2(L_fK_f-L_rK_r)\}$$

Mode 6

According to a principle similar to that of Mode 4, a sliding mode control is performed by using $$S=d\beta/dt+c(\beta-\beta_m)$$

From $(dS/dt)+kS=0$ $$(d^2\beta/d^2t)+(c+k)(d\beta/dt)+kc(\beta-\beta_m)=0$$

$$(d\beta/dt)=\{(Y_f+Y_r)/mV\}-\gamma$$

$$(d\gamma/dt)=\{(L_fK_f-L_rK_r)/I\}+(M_z/I)$$

Therefore, $$M_z=-(L_fK_f-L_rK_r)+(I/mV)\{(dY_f/dt)+(dY_r/dt)\}+cI(d\beta/dt)+kcI(\beta-\beta_m)$$

where c and k are appropriately selected constants, and I is the moment of inertia for the yaw movement of the vehicle body.

Modes 1 to 3 are based on a yaw rate assist control, and Modes 4 to 6 are based on a vehicle body side slip angle assist control. Of these, those other than Modes 1 and 4, in particular Modes 3 and 6, involve an excessive intervention of the vehicle operator, and are therefore relatively unsuitable for practical use without a certain corrective measure because of a poor course tracking capability.

For the details of these techniques, reference should be made to U.S. Pat. No. 6,233,513 issued May 15, 2001 and U.S. Pat. No. 6,334,656 issued Jan. 1, 2002 to the same inventors. The contents of these prior patents are hereby incorporated in the present application by reference.

Such a vehicle operation assist control system can be applied in a straight forward manner when the vehicle is required to simply follow the road path. However, when the vehicle operator takes an evasive steering action which does not conform to the curvature of the road path or changes the driving lane, the control system may hamper the vehicle operator in taking such an action. Therefore, according to the present invention, the vehicle is equipped with a radar unit for detecting the presence of an obstacle by using ultrasonic sound, electromagnetic radiation or light, a computing unit for computing an alternate course for avoiding the detected obstacle, and a vehicle operation assist unit for supporting or assisting the vehicle operator achieve the computed alternate course, instead of hampering the vehicle operator in taking such an evasive action.

For instance, when changing the driving lane to avoid an obstacle in an emergency situation, the path for taking an evasive action is determined as a curvature given as a mathematical function of the vehicle position. Although there are an infinite number of possible courses for the evasive action, a course defined by sinusoidally changing curvature is selected in this case. As can be readily appreciated by a person skilled in the art, it is possible to select other mathematical functions to achieve a same goal.

In the following equations, the amplitude $\kappa_0$ is determined so that (X, Y) determined by integrating the following equations over one cycle is equal to a required width of evasion.

$$d^2X/ds^2=-\kappa_0\sin(2\pi s/L_p)(dY/ds)$$

$$d^2Y/ds^2=-\kappa_0\sin(2\pi s/L_p)(dX/ds)$$

In practical applications, it is also necessary to consider the vehicle speed V, and control the vehicle speed. Here, (X, Y) is a position coordinate in a Cartesian coordinate system, s is the position coordinate defined along the travel path of the vehicle, and $L_p$ is the distance to the obstacle at the time the evasive action is started.

According to a more simplified method, if it is assumed that the vehicle travels at a constant speed, and $d^2y/dt^2=V^2/\rho$, the problem reduces to finding $\rho_0$ of the following equation which would results in a lateral displacement equal to D as the vehicle travels $L_p$ or during a time period $T=L_p/V$.

$$1/\rho=1/\rho_0\sin(2\pi Vt/L_p)$$

where, y is the lateral displacement from the traveling path. From this equation, $$dy/dt=(V^2/\rho_0)(L_p/2\pi V)\{1-\cos(2\pi Vt/L_p)\}$$

Therefore, $$y=(V^2/\rho_0)(L_p/2\pi V)\{t-(L_p/2\pi V)\sin(2\pi Vt/L_p)\}$$

Suppose that y=D when $t=(L_p/V)$ $$1/\rho_0=2\pi D/L_p^2$$

or $$\rho_0=L_p^2/2\pi D$$

Figure 1:
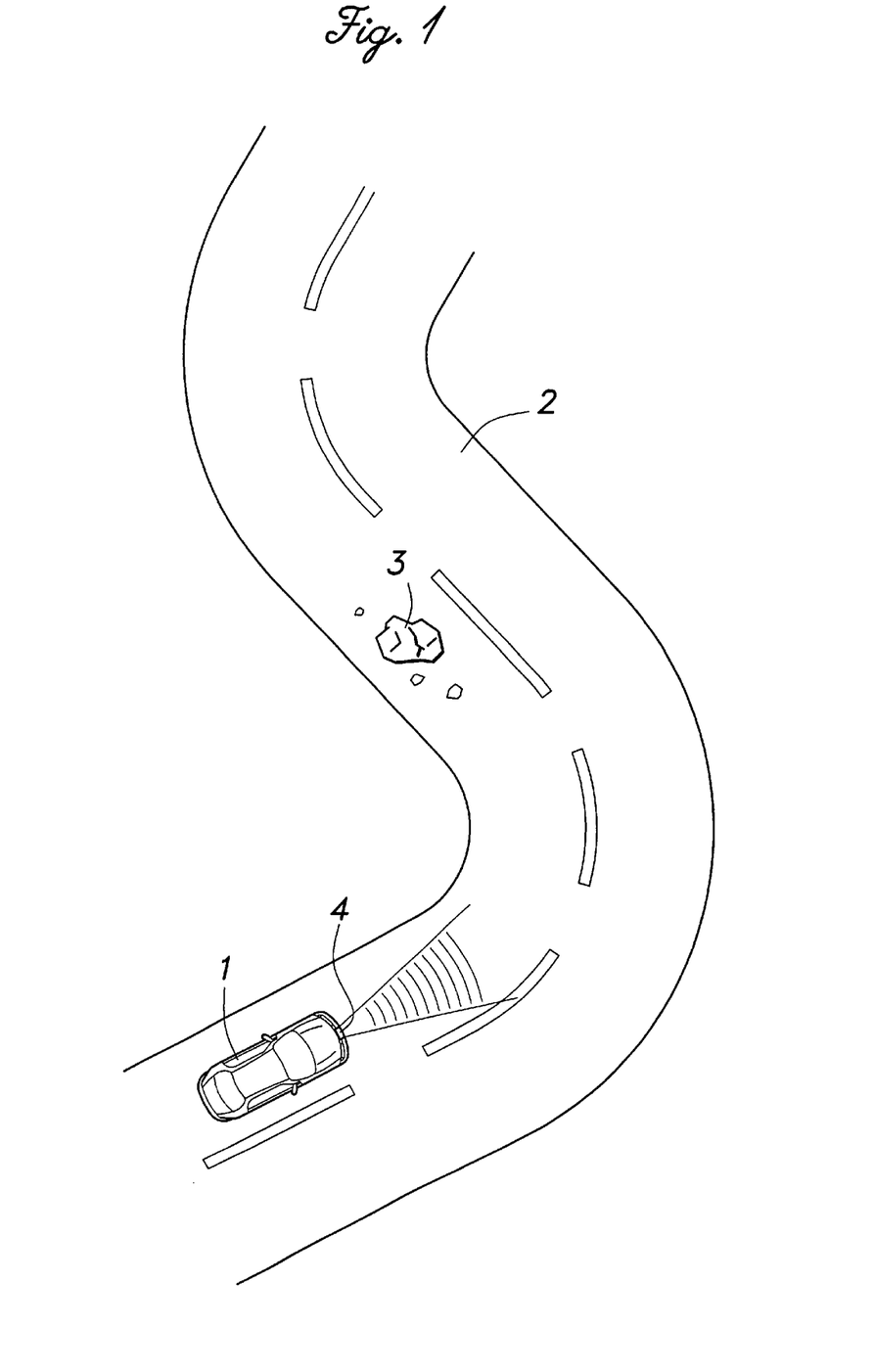
FIG. 1 is a diagram showing a vehicle equipped with a vehicle operation assist control system embodying the present invention entering an S curve.
Figure 2:
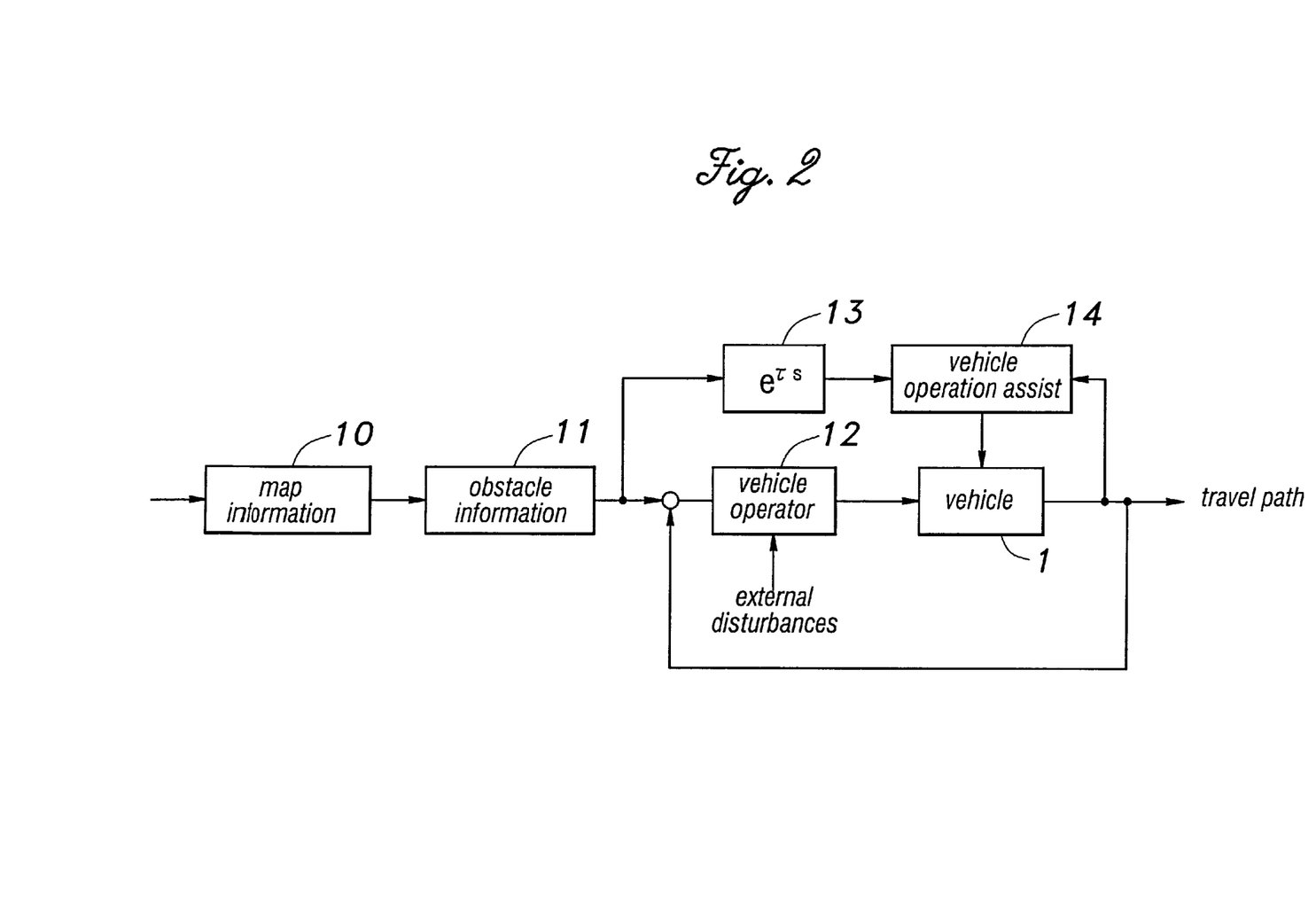
FIG. 2 is a block diagram of the vehicle operation assist control system according to the present invention.

FIG. 1 shows a vehicle 1 equipped with a vehicle operation assist control system of the present invention traveling along an S curve 2, and FIG. 2 is a block diagram showing the structure of the vehicle operation assist control system, a part of which consists of various functions performed by an appropriately programmed microcomputer. First of all, road information is acquired by using map information acquiring means 10 incorporated with a GPS unit and map data. Obstacle information acquiring means 11 incorporated with an onboard radar unit 4 detects the presence of an obstacle 3 on the road 2, the distance to the obstacle and the width of the obstacle. The vehicle operator 12 drives the vehicle in a normal fashion according to the visually acquired information on the road ahead of the vehicle. The vehicle operation assist control system 14 assists the vehicle operation by controlling the distribution of the brake/drive force between the right and left wheels according to the road information and obstacle information, inevitably involving a certain time delay element 13.

Figure 3:
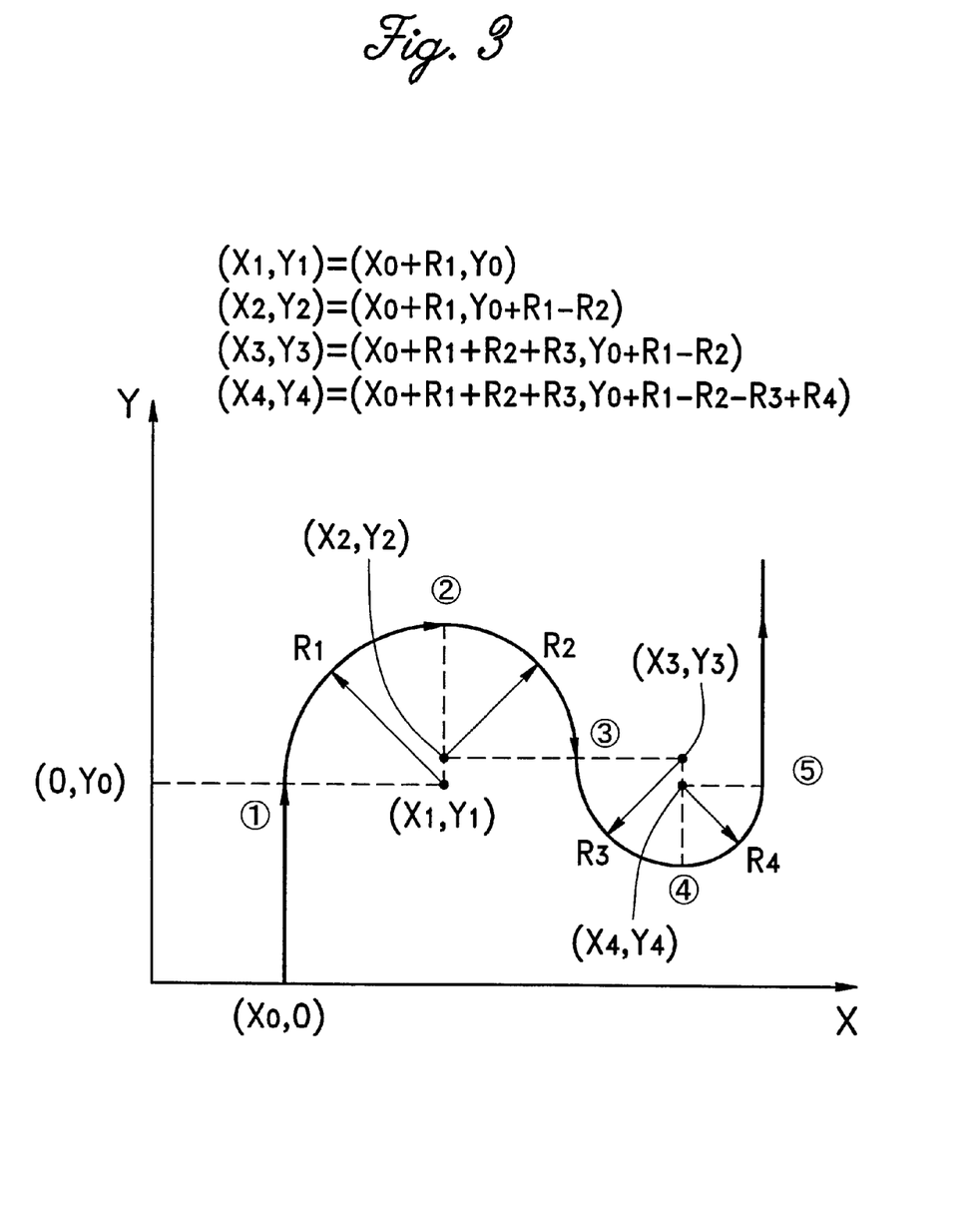
FIG. 3 is a diagram showing a mathematical representation of the S curve.
Figure 4:
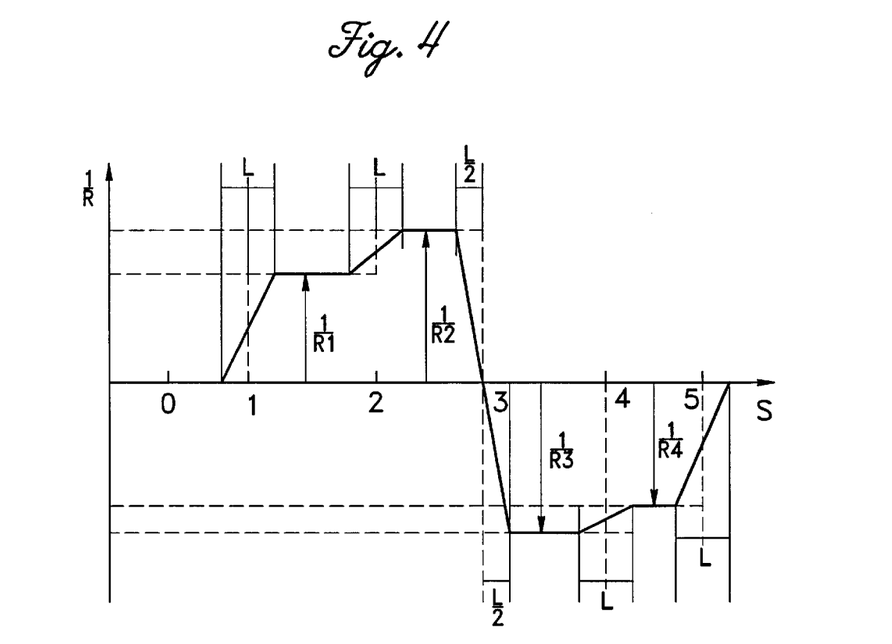
FIG. 4 is a graph defining the curvature which change along the length of the curve in a continuous manner.

FIG. 3 shows an S curve given as an example for evaluating the performance of the vehicle operation assist control system 14 of the present invention. In FIG. 4, $$X_0=10 \text{ m}, Y_0=55 \text{ m}, R_1=60 \text{ m}, R_2=50 \text{ m}, R_3=60 \text{ m, and } R_4=50 \text{ m.}$$

Figure 5:
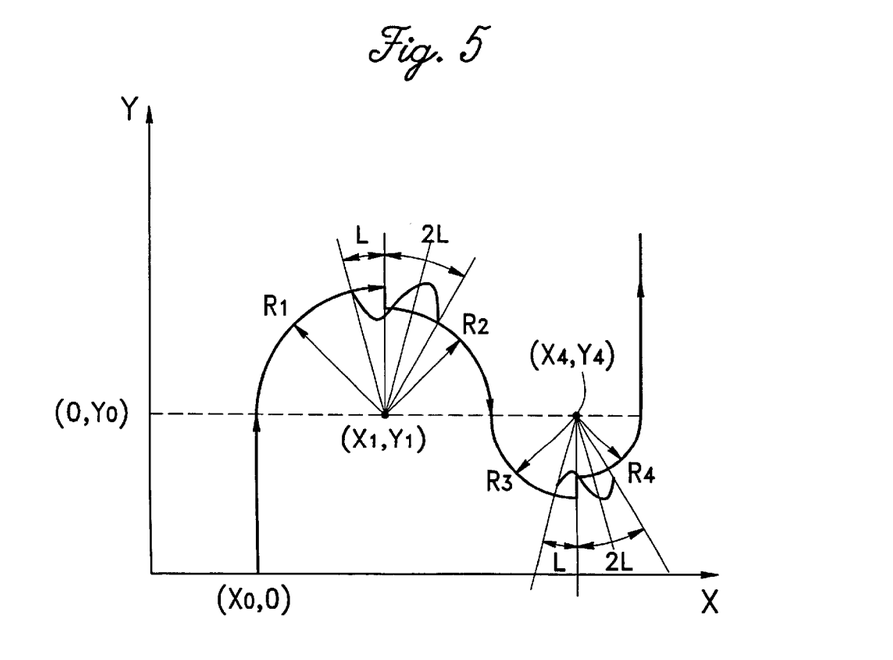
FIG. 5 is a view similar to FIG. 3 showing an evasive course for avoiding an obstacle in the S curve.

To avoid the curve from having any discontinuity in curvature, the road information is defined by modifying this curve by using clothoid curves as shown in FIG. 4. The target road path for the evasive action is determined as given in FIG. 5. In other words, $$1/\rho=(1/\rho_0)\sin(2\pi s/3L_p)(s=0\sim 3L_p),$$

and $$R_1=60 \text{ m}, R_2=56 \text{ m}, R_3=60 \text{ m, and } R_4=56 \text{ m.}$$

The vehicle operator is represented by the following transfer function.

$$\delta=-h_s e^{-\tau s}\epsilon_h\cong-h_s\epsilon_h\{1-(\tau s/2)\}/\{1+(\tau s/2)\},$$

or $$(\tau/2)(d\delta/dt)+\delta=-h_s\epsilon_h\{1-(\tau s/2)\}$$

Therefore, $$(d\delta/dt)=-2h_s\epsilon_h/\tau+h_s(d\epsilon_h/dt)-2\delta/\tau$$

To take into account a slight lack of attentiveness on the side of the vehicle operator, it is assumed that the vehicle operator does not steer the vehicle for a time period of (V/L$_x$) after entering the first curve from the straight section of the road at point (1) in FIG. 3, and then starts steering the vehicle according to the error information of the part of the road which is L$_x$ m ahead of the vehicle.

FIGS. 6 to 10 show the results of simulation runs for investigating the performance of the vehicle operation assist control system in improving the capability to track the road path as a man-machine system, and evaluating the stability of the system. The vehicle model that was used for the simulation runs consisted of a 14-degree of freedom non-linear model incorporated with a composite slip type tire model. The tire model was a brush type model, and the composite properties of the lateral force and fore-and-aft force were obtained by integrating the strain of the tire on the tire contact surface. A small passenger car equipped with the vehicle operation assist control system was simulated, and the model for the vehicle operator consisted of a first-order prediction model.

Figure 6:
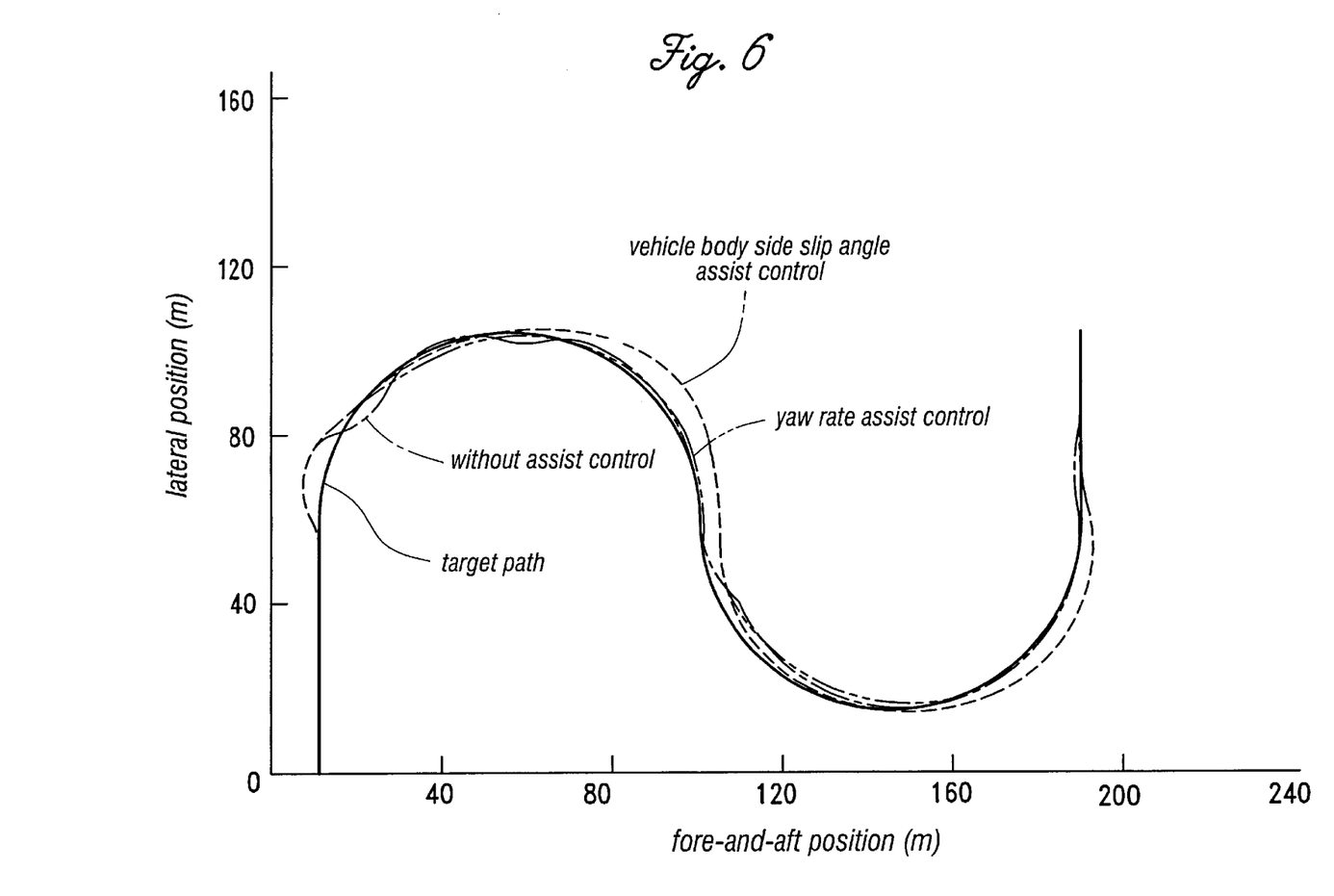
FIG. 6 is a diagram showing the path of the vehicle when there is no obstacle with and without the vehicle operation assist control system of the present invention.
Figure 7:
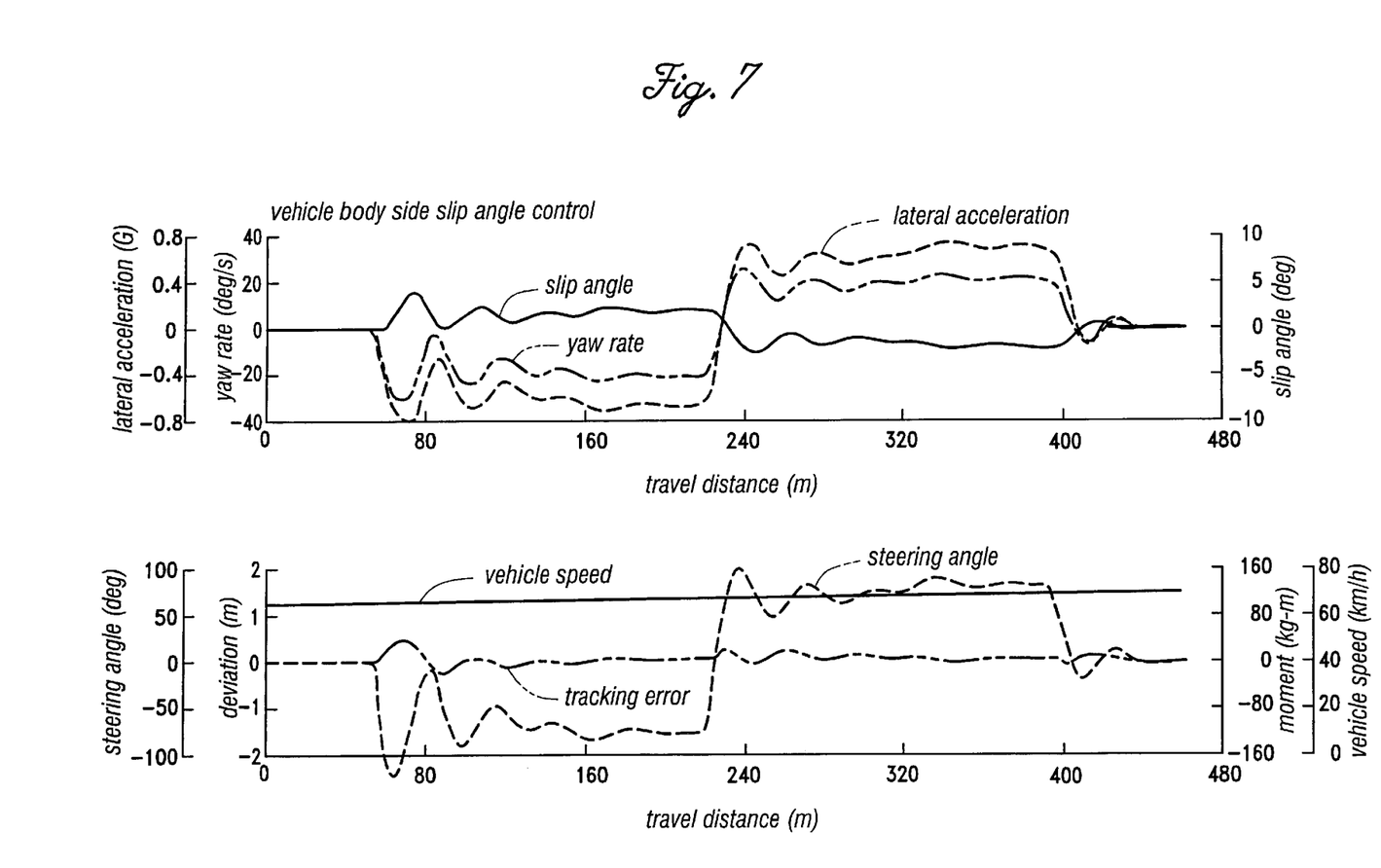
FIG. 7 is a graph showing the performance in tracking the target course shown in FIG. 6 without the vehicle operation assist control system of the present invention.
Figure 8:
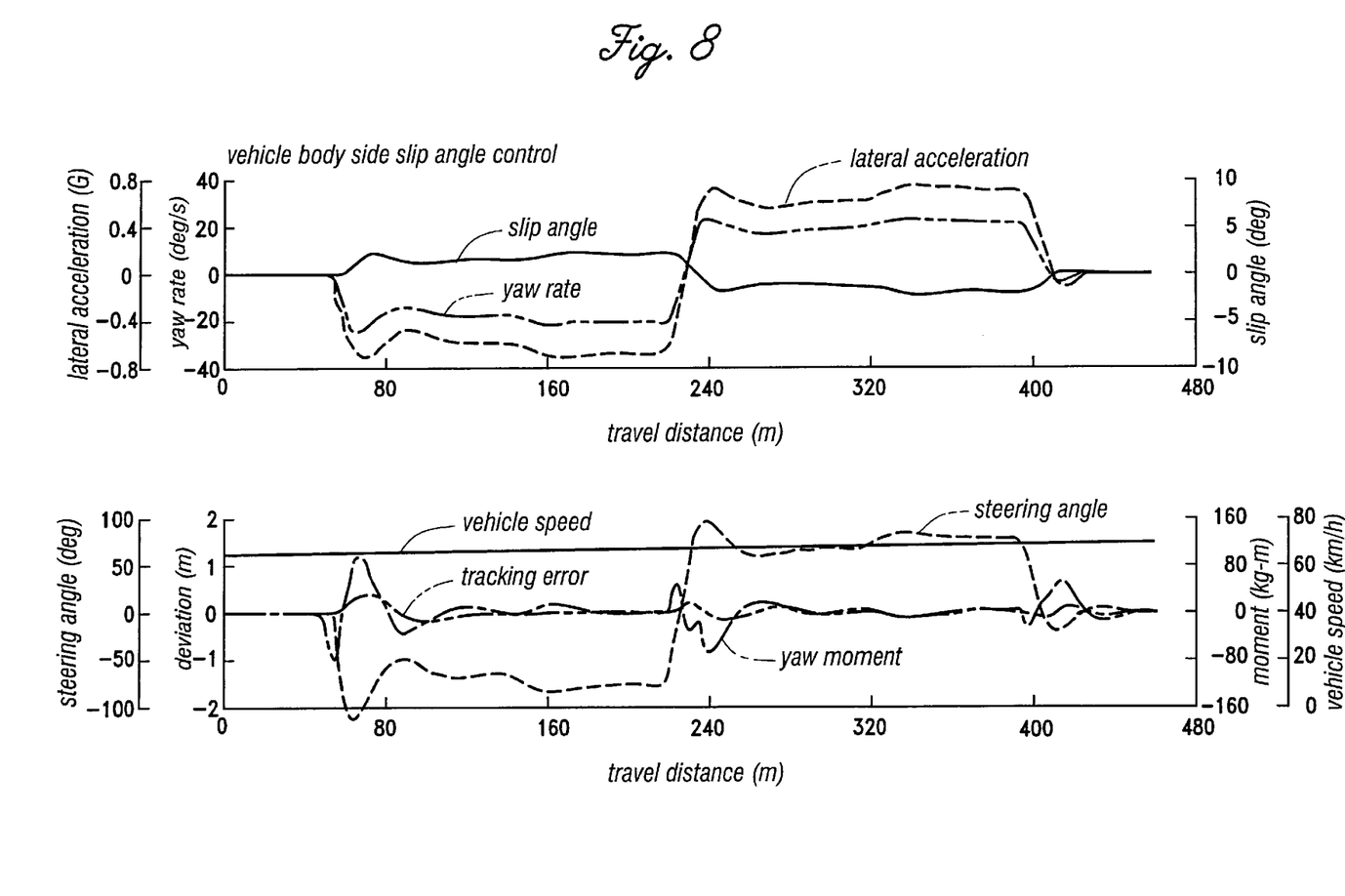
FIG. 8 is a graph showing the performance in tracking the target course shown in FIG. 6 with the vehicle operation assist control system of the present invention based on the yaw rate control.
Figure 9:
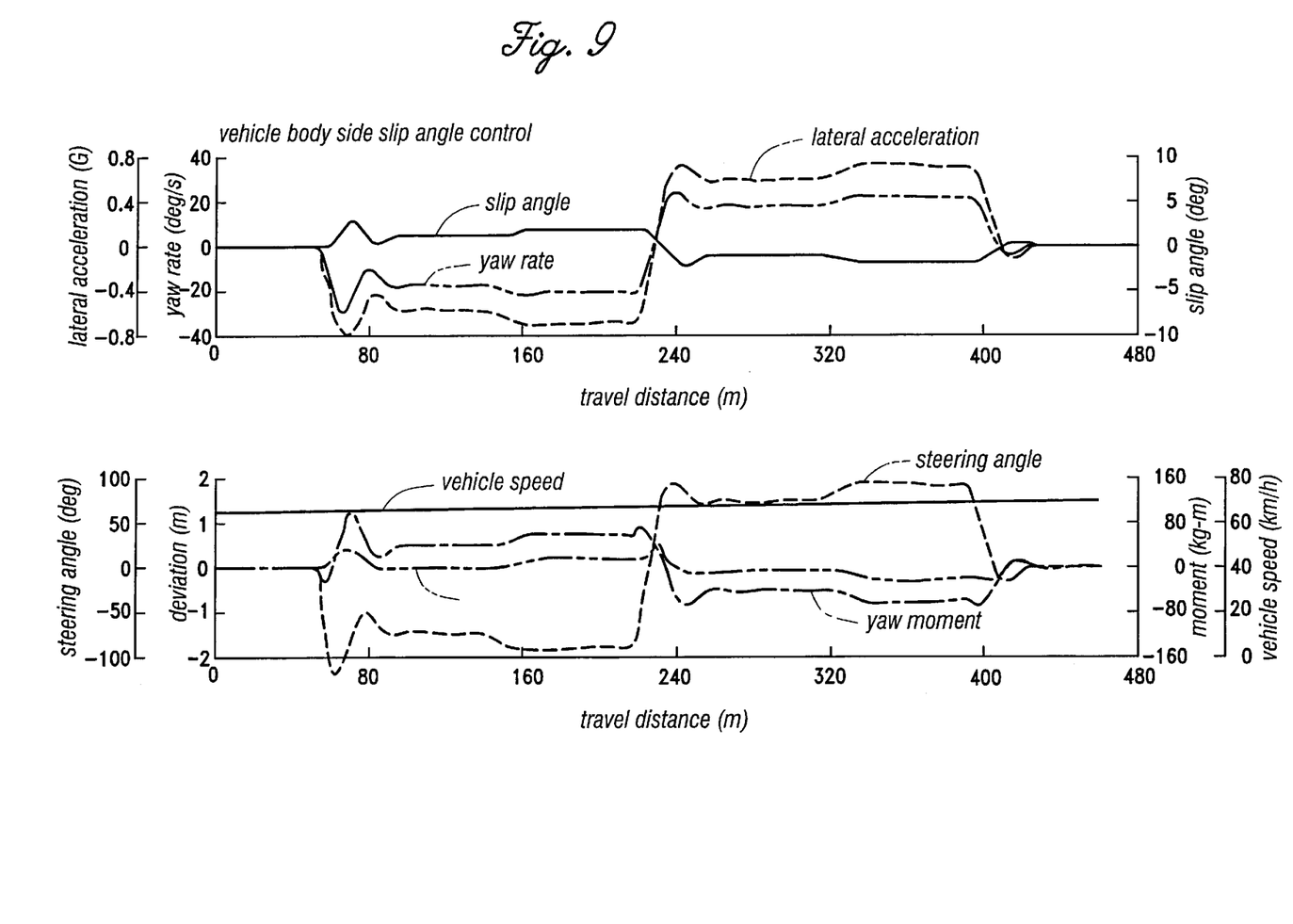
FIG. 9 is a graph showing the performance in tracking the target course shown in FIG. 6 with the vehicle operation assist control system of the present invention based on the vehicle body side slip angle control.

Computer simulation runs for curved roads having various radii of curvature were conducted to evaluate the performance of the vehicle operation assist control system as a man-machine system. FIG. 6 shows the course deviation of the man-machine system when traveling a curved road with and without the vehicle operation assist control system of the present invention. To verify the effectiveness of the vehicle operation assist control system in complementing the control performance of the vehicle operator, it was assumed that the vehicle operator did not take any steering action for one second after entering the curve. Typical examples of the vehicle operator's steering action and the vehicle response are shown in FIGS. 7 to 9. The yaw rate control is effective in terms of both the tracking capability and stability of the vehicle. On the other hand, the vehicle body side slip angle control is more effective in ensuring the stability of the vehicle than the yaw rate control, but is less effective in improving the course tracking capability than the yaw rate control.

Figure 10:
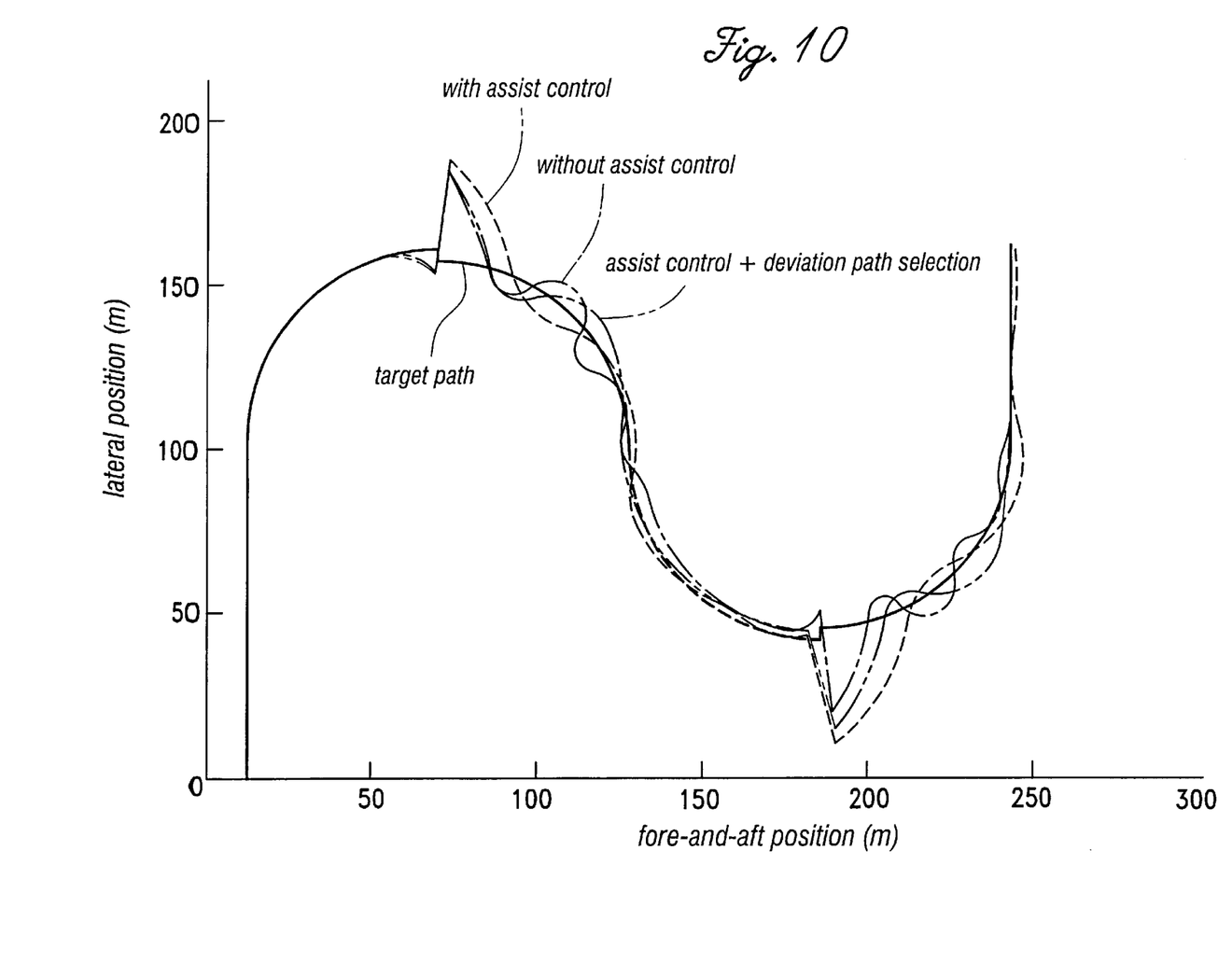
FIG. 10 is a diagram showing the traveling paths in relation to the target traveling path when there is an obstacle on the road for cases where the yaw rate control and the vehicle body side slip angle control of the present invention are performed as well the case where the vehicle operation assist control system is not used.

To evaluate the influences of the concept of defining an alternate evasive course on the stability and course tracking capability of the vehicle, a response of a man-machine system when changing the driving lane during a cornering was investigated as a representative example of evasive action which an actual vehicle is likely to encounter on the road. FIG. 10 shows the result of the concept of defining an alternate evasive course. The yaw rate control causes an unfavorable influence on the response of the vehicle, but allows the man-machine system to take a course which avoids the obstacle with a minimum lateral travel.

The present invention proposes a vehicle operation assist control system which assists the vehicle operator by making use of relatively simple environmental information, and the effectiveness of the control system was evaluated by computer simulation. The results can be summarized as given in the following.

(1) The yaw rate control and vehicle body side slip angle control both improve the stability of the vehicle to a certain extent, but the vehicle body side slip angle control slightly impairs the course tracking capability.

(2) The vehicle operation assist control system of the present invention allows the man-machine system to avoid an obstacle by selecting an evasive course which minimizes the lateral travel and ensures the stability of the vehicle.

In the foregoing description, it was assumed that the vehicle travels at a constant speed. However, the vehicle operator typically applies a brake to the vehicle in an emergency situation. The system of the present invention is capable of a prediction which is adequate for practical purposes even when the speed of the vehicle changes by making suitable modifications to the system as required.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle operation assist control system for assisting a vehicle operator to operate a vehicle, comprising:

map information means for providing map information of a road ahead of the vehicle;

vehicle operation assist means for assisting the vehicle operator to operate the vehicle; and obstacle information acquiring means for acquiring information on an obstacle which lies ahead of the vehicle, said information including a distance to the obstacle and a width of the obstacle;

the vehicle operation assist means being adapted to determine an evasion path, when an obstacle is detected by the obstacle information acquiring mean, and modifying the map information provided by the map information means, according to the distance to the obstacle and the width of the obstacle detected by the obstacle information acquiring means.

2. A vehicle operation assist control system according to claim 1, wherein the evasive path is defined as a curvature which changes as a sinusoidal mathematical function of the position of the vehicle along the path.

3. A vehicle operation assist control system according to claim 1, wherein the vehicle operation assist means is based on a yaw rate control.

4. A vehicle operation assist control system according to claim 1, wherein the vehicle operation assist means is based on a vehicle side slip angle control.

* * * * *